United States Patent [19]
Yu

[11] Patent Number: 5,423,501
[45] Date of Patent: Jun. 13, 1995

[54] IRRIGATION HOSE HANGER

[76] Inventor: Michael Yu, 1270 Shakespeare Dr., Concord, Calif. 94521

[21] Appl. No.: 355,432

[22] Filed: Dec. 13, 1994

Related U.S. Application Data

[63] Continuation of Ser. No. 24,182, Feb. 26, 1993, abandoned, which is a continuation-in-part of Ser. No. 991,727, Dec. 17, 1992, abandoned, which is a continuation-in-part of Ser. No. 924,191, Aug. 3, 1992, abandoned, which is a continuation-in-part of Ser. No. 834,149, Feb. 10, 1992, abandoned.

[51] Int. Cl.$^6$ .............................................. E21F 17/02
[52] U.S. Cl. .............................................. 248/61; 248/62; 248/74.1
[58] Field of Search .................. 248/49, 51, 61, 62, 248/63, 71, 72, 74.1, 316.1, 313, 316.5, 58; 24/20 EE, 20 TT, 20 R; 285/252; 403/397

[56] References Cited

U.S. PATENT DOCUMENTS

| | | | |
|---|---|---|---|
| 106,527 | 8/1870 | Woodruff | 24/20 EE |
| 355,493 | 1/1987 | Wiley . | |
| 1,141,316 | 6/1915 | Cockrell | 248/61 |
| 1,164,613 | 12/1915 | Jewell . | |
| 1,242,027 | 10/1917 | Olmsted . | |
| 1,476,764 | 12/1913 | Morhoff et al. | 248/71 |
| 2,303,108 | 11/1942 | Blacklurn | 248/61 |
| 2,405,912 | 8/1946 | Tinnerman | 24/20 |
| 2,417,269 | 3/1947 | Robertson | 248/61 |
| 2,942,819 | 6/1960 | Brogan | 248/71 |
| 3,286,694 | 11/1966 | Landy | 119/103 |
| 3,605,200 | 9/1971 | Vallinotto et al. | 24/20 TT |
| 3,606,651 | 5/1969 | Goodman | 24/484 X |
| 3,893,647 | 7/1975 | Kennedy | 248/73 |
| 3,913,187 | 10/1975 | Okuda | 24/484 |
| 3,925,851 | 12/1975 | Bevans | 24/20 TT |
| 4,128,918 | 12/1978 | Wenk | 24/16 R |
| 4,183,120 | 1/1980 | Thorne | 24/20 TT X |
| 4,483,556 | 11/1984 | LiVolsi | 285/252 |
| 4,557,024 | 12/1985 | Roberts et al. | 24/20 TT |
| 4,564,163 | 1/1986 | Barnett | 248/71 |
| 4,601,450 | 7/1986 | Lindquist | 248/71 |
| 4,674,720 | 6/1987 | Fetsch | 248/74.1 |
| 4,724,583 | 2/1988 | Ojima | 24/20 R |
| 4,773,129 | 9/1988 | Muhr | 24/20 R |
| 4,944,475 | 7/1990 | Ono et al. | 248/71 |
| 4,987,652 | 1/1991 | Spaulding | 24/20 R |
| 5,024,405 | 6/1991 | McGuire | 248/73 |
| 5,048,462 | 9/1991 | Hostetler | 248/61 |
| 5,108,055 | 4/1992 | Kreinberg et al. | 248/71 |
| 5,133,523 | 7/1992 | Daigle et al. | 248/71 X |
| 5,148,576 | 9/1992 | Dyer | 24/20 EE |
| 5,150,927 | 9/1992 | Skinner | 285/189 |
| 5,157,815 | 10/1992 | Dyer | 24/20 TT X |

Primary Examiner—Alvin C. Chin-Shue
Assistant Examiner—Korie Chan
Attorney, Agent, or Firm—Baker & Botts

[57] ABSTRACT

Apparatus for fastening to an irrigation hose and a suspended wire is provided. The apparatus comprises a flexible band forming a substantially annular cavity. The band has two free ends to which are attached first and second interlocking members of a hose clamping assembly. A wire clamping member is formed integral to said band and located directly opposed to said hose clamping member. The apparatus is easily installed and removed for reuse.

6 Claims, 3 Drawing Sheets

IRRIGATION HOSE HANGER

RELATED APPLICATION

This application is continuation of application Ser. No. 08/024,182, filed Feb. 26, 1993, entitled "Irrigation Hose Hanger" by Michael Yu, abandoned, which is a continuation-in-part of application Ser. No. 07/991,727, filed Dec. 17, 1992, entitled "Irrigation Hose Hanger" by Michael Yu, abandoned, which is a continuation-in-part of application Ser. No. 07/924,191, filed Aug. 3, 1992, entitled "Irrigation Hose Hanger" by Michael Yu, abandoned, which is a continuation-in-part of application Ser. No. 07/834,149, filed Feb. 10, 1992 entitled "Irrigation Hose Hanger" by Michael Yu, abandoned.

TECHNICAL FIELD OF THE INVENTION

This invention relates in general to the field of irrigation systems, and more particularly, to an irrigation hose hanger.

BACKGROUND OF THE INVENTION

In the field of irrigation systems, the drip system has become one of the most popular water delivery method, especially in regions where rainfall is insufficient during the growing season. The drip system is advantageous over other irrigation methods mainly because it delivers water only to those spots where it is needed. Not only water consumption is decreased, but the crop benefits for a number of reasons. Incidents of mildew and other undesirable fungus is minimized since the water is only delivered to the feeder roots of each plant. Weeds in the field are also discouraged because of surface soil is mostly dry. The drip system is also the preferred irrigation method when the planting field is not level, such as a hillside.

In a conventional drip water delivery system, water is carried in drip hoses hanged below high tensile wires suspended approximately two feet above the ground. The drip hoses are hung above ground to prevent damage by farm equipment traffic and rodents. It is also easier to spot a plugged drip head when it is located above ground.

The drip hoses are generally not fixedly fastened to the high tensile wires and are merely hung below the wires. In some conventional systems, the devices used to hang the hoses are simply lengths of plastic with ends that will fasten together to form a loop. Other systems use minor variations of such device. Therefore in the conventional drip systems, the wire and the drip hose are loosely tied together and are free to move with respect to one another. The drip hose move due to a number of reasons. The drip hoses inevitably sag between where the hangers are used due to the weight of the water. The surge of water in the drip hoses may also cause some movements. The uneven field where the drip system is used may cause the hose to stretch and migrate downhill.

Displacement between the hangers and hoses may disadvantageously cause the drip heads to be moved away from the designated water delivery spots. The valleys created by sagging hoses may cause an accumulation of water and thus encourage the growth of algae and undesirable fungus, which may contribute to plugged drip heads. In addition, the hangers may become unevenly distributed and allow a majority of the weight of the hose and water to be unsupported. Thus, the drip hose connections may be pulled apart by the unsupported weight, and cause a leak in the system.

Therefore, it is desirable to provide a drip hose hanger which securely fastens a drip hose to its high tensile suspension wire to prevent disadvantageous movement therebetween.

SUMMARY OF THE INVENTION

In accordance with the present invention, an irrigation hose hanger is provided which substantially eliminates or reduces disadvantages and problems associated with prior devices.

In one aspect of the present invention, apparatus for fastening an irrigation hose to a suspended wire is provided. The apparatus comprises a flexible band forming a substantially annular cavity. The band has two free ends to which are attached first and second interlocking members of a hose clamping assembly. A wire clamping member is formed integral to said band and located directly opposed to said hose clamping member.

An important technical advantage of the present invention provides a secure fastening means of suspending irrigation hoses in a drip water delivery system. The common problems associated with conventional systems are avoided, such as shifted drip heads due to the weight of the water, gravity on a sloping field. Additionally, problems of plugged drip heads and leakage caused by a displacement of conventional hangers are avoided.

BRIEF DESCRIPTION OF THE DRAWINGS

For a better understanding of the present invention, reference may be made to the accompanying drawing, in which.

DETAILED DESCRIPTION OF THE INVENTION

Figure 1:
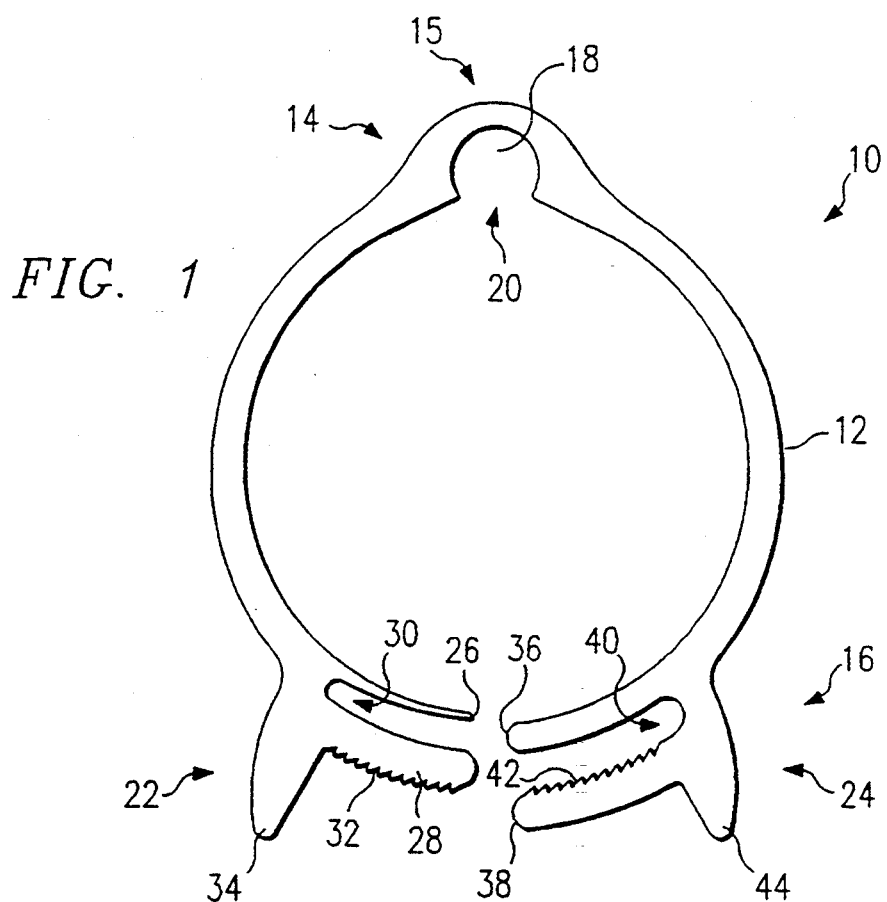
FIG. 1 is a side elevational view of the preferred embodiment of the present invention.

With reference to the drawings, FIG. 1 illustrates a preferred embodiment of irrigation hose hanger, indicated generally at 10 and constructed according to the teaching of the present invention. Hose hanger 10 includes a substantially annular open-ended band 12, a wire clamping member 14 and a hose clamping assembly 16.

Wire clamping member 14 is formed substantially integral with band 12 and is located directly opposed to the open ends of band 12 and hose clamping assembly 16. Wire clamping member 14 includes a substantially annular cavity 18 formed in band 12 having an opening 20 of a dimension generally less than that of its diameter. The diameter of annular cavity 18 may be determined generally by the dimension of the high tensile wire (FIG. 2) hose hanger 10 is designed to accompany. Since wire clamping member 14 is adaptable to be fixedly and securely clamped onto the wire, the diameter of annular cavity 18 is substantially less than that of the wire, so that wire clamping member 14 is capable of fastening tightly to the wire. Wire clamping member 14 preferably includes a flat surface 15 to facilitate the clamping operation by allowing force to be exerted evenly in a downward direction. Constructed in this manner, the operator may use his/her thumb to push hose hanger 10 down and onto a wire with ease.

Hose clamping assembly 16 includes two interlocking members 22 and 24 located on the open ends of band 12. Interlocking member 22 includes a tongue 26 and a jaw member 28 forming an elongated and open-ended cavity 30. On the surface of jaw member 28 directed away from band 12 are a set of substantially triangular teeth 32 pointed generally away from interlocking member 24. A lever 34 protrudes from where the open end of band 12, tongue 26, and jaw member 28 joins, and projects away from band 12.

Interlocking member 24 is constructed similarly to interlocking member 22 and includes a tongue 36 and jaw member 38. Tongue 36 of interlocking member 24 is generally somewhat thicker than tongue 26 of interlocking member 22, and is also joined to jaw member 38 to form an elongated and open-ended cavity 40. The surface of jaw member forming one side of cavity 40 are a second set of substantially triangular teeth 42 pointed generally away from interlocking member 22. Additionally, interlocking member 24 includes a lever 44.

In operation, the preferred embodiment of hose hanger 10 is designed and constructed so that teeth 42 of jaw member 38 meshes and interlocks teeth 32 of jaw member 28 when interlocking members 22 and 24 are pushed toward one another by pressing on levers 34 and 44. As such, cavity 30 is adapted to receive tongue 36, and both tongues 26 and 36 act to bias jaw member 28 toward jaw member 38 to ensure a tight lock. It is apparent that no tools are required to press interlocking members together since levers 34 and 44 provide sufficient leverage for pressure exerted by human fingers. It is also apparent that hose hanger 10 may accommodate hoses within a range of sizes.

Figure 2:
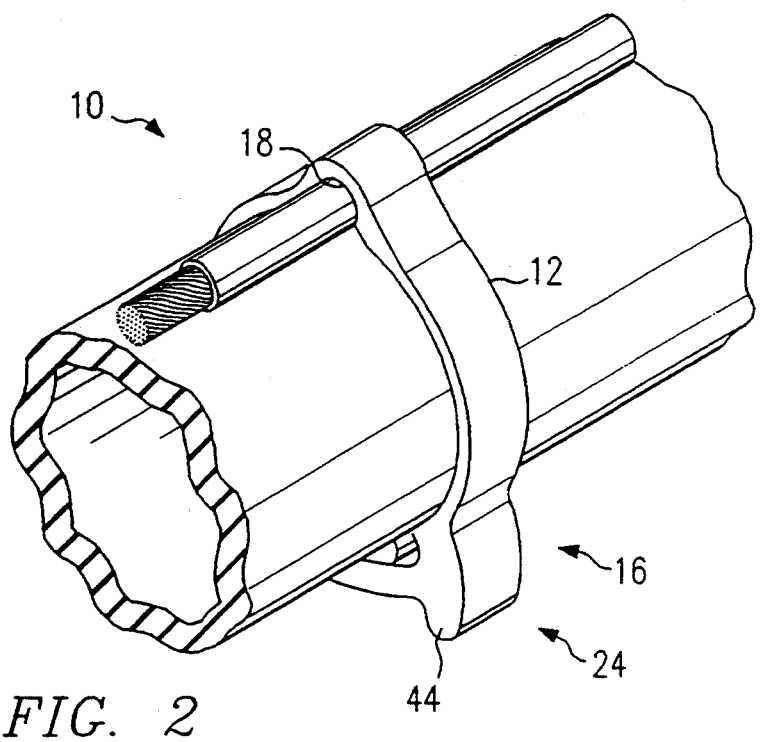
FIG. 2 is a perspective view of the preferred embodiment of the present invention shown securely fastening length of a drip hose to a wire.

Referring to FIG. 2, hose hanger 10 is shown where wire clamping member 14 is securely fastened to a wire and hose clamping assembly is securely attached to a hose. Teeth 32 of jaw member 28 is engaged with teeth 42 of jaw member 38 thus effecting a secure hold on the hose. Note that in order to securely fasten hose hanger 10 to the hose, levers 34 and 44 are pressed toward one another until band 12 is tightly wrapped around the full circumference of the hose. It can be seen that as the wire is forced into the slightly smaller circumference of the wire clamping member 14, the memory of the plastic will enable the wire to be held securely. But as the hose clamping assembly is secured around a hose, the wire clamping member 14 is forced around the wire even tighter. This structure and function enables a fixed relation between the wire and the hose, thus ensures a stable installation.

Figure 3:
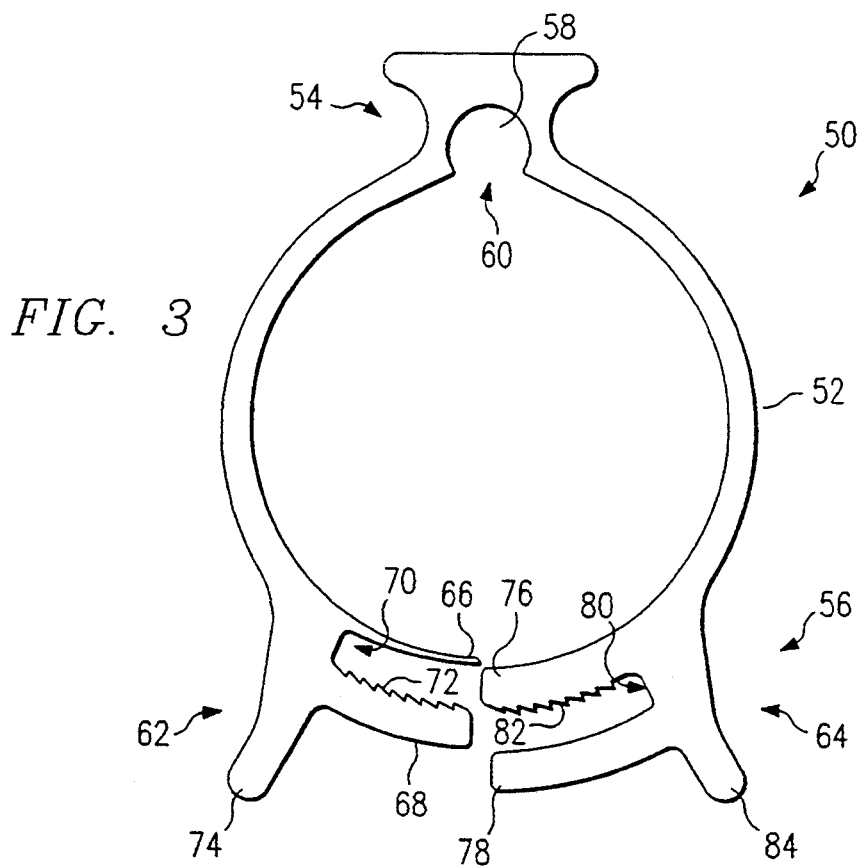
FIG. 3 is a side elevational view of another preferred embodiment of the present invention.

Referring to FIG. 3, yet another embodiment of the hose hanger 50 is shown. Hose hanger 50 includes a flexible annular band 52, a wire clamping member 54, and a hose clamping assembly 56. Wire clamping member 54 is generally like that of embodiment 10 as shown in FIG. 1, but has additionally a flattened top to facilitate the exertion of downward force that enables cavity 58 and opening 60 to clamp around a wire. In addition, hose clamping assembly 56 includes interlocking members 62 and 64 constructed in a slightly different manner than that of hose hanger 10. Interlocking member 62 includes a biasing tongue 66 and a jaw member 68 forming an elongated open-ended cavity 70. Jaw member 68 has generally triangular teeth 72 pointing generally toward wire clamping member 54. In addition, a lever 74 joining tongue 66, jaw member 68 and band 52 is provided. Interlocking member 64 includes a jaw member 76 having teeth 82 pointing toward jaw member 68 and a biasing tongue 76. Jaw member 76 and tongue 78 define another elongated opening 80. Teeth 82 and teeth 72 of jaw members 76 and 68 are constructed so that they are capable of meshing and interlocking easily. Another biasing tongue 78 is provided. Tongues 66 and 78 function to force jaw members 68 and 76 toward one another so that they stay interlocked when hose hanger 52 is in use. Levers 74 and 84 facilitate the exertion of opposing forces to close hose clamping assembly 56 around a hose so that jaw member teeth 72 interlock with jaw member teeth 82. It has been shown that biasing tongue 78 is optional, the absence of which does not adversely affect the operation of the hose hanger 50.

Referring to FIGS. 4 and 4a-c, various embodiments of compression nodes and ridges are shown. Compression nodes and ridges are formed along the inner surface of the annular band 52 to add additional gripping strength and the capacity to adapt to possible varying circumferences of irrigation hoses.

Figure 4:
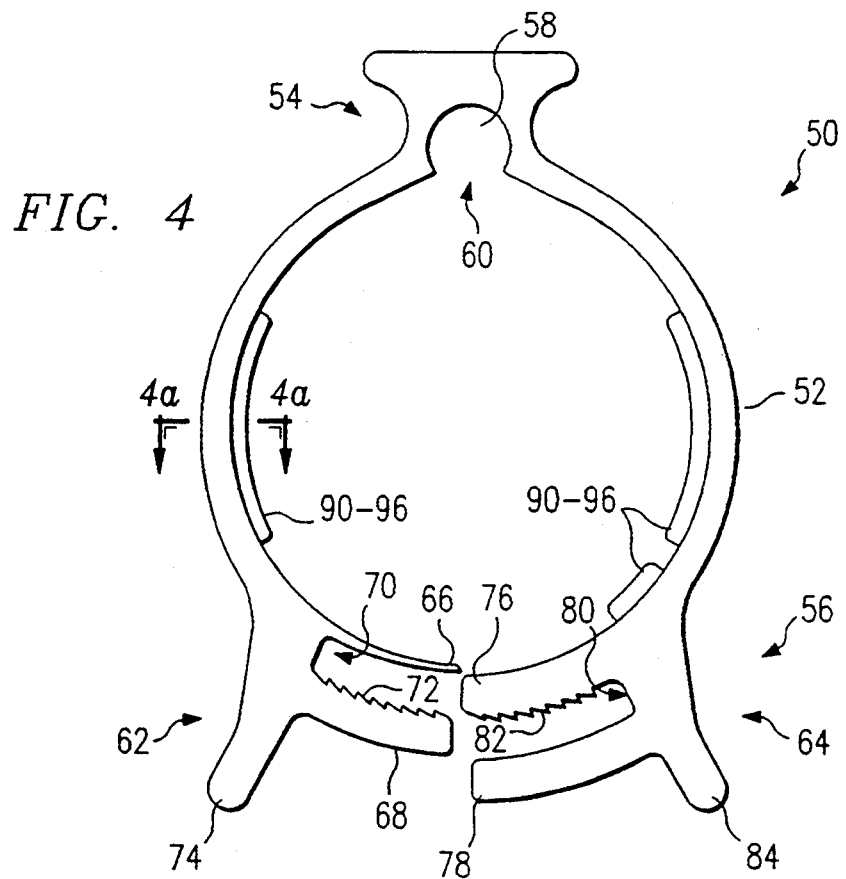
FIGS. 4a–c are views of a compression ridge.
Figure 4A:
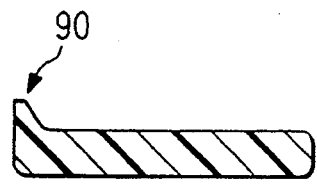
Figure 4B:
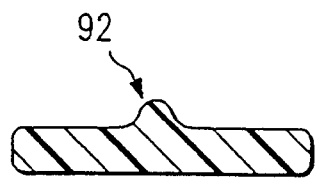
Figure 4C:
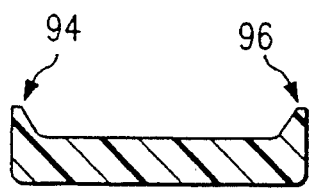

In FIG. 4a, one edge along the inner surface of annular band 52 is made to protrude toward the center of the ring. The amount of profusion, effectively forming a ridge 90, may be approximately 0.5 mm tall. FIG. 4b shows yet another embodiment 92 of the compression ridge, formed approximately midway of the width and along the inner surface of the annular band 52. FIG. 4c shows ridges 94 and 96 formed along both edges of the band toward the center of the ring.

In operation, the compression nodes (a shortened version of a ridge) and ridges 90–96 help the flexible annular band 52 to conform tightly around the irrigation hose. Because of variations in the circumference of hoses, the mere spacing of the teeth 72 may be inadequate to clamp tightly around the hose. In other words, when the clamp may be too loose around the hose when the first three sets of teeth are meshed, for example, and yet the fourth set of teeth cannot be forced to engage, compression nodes and ridges 90–96 take up the slack.

Figure 5:
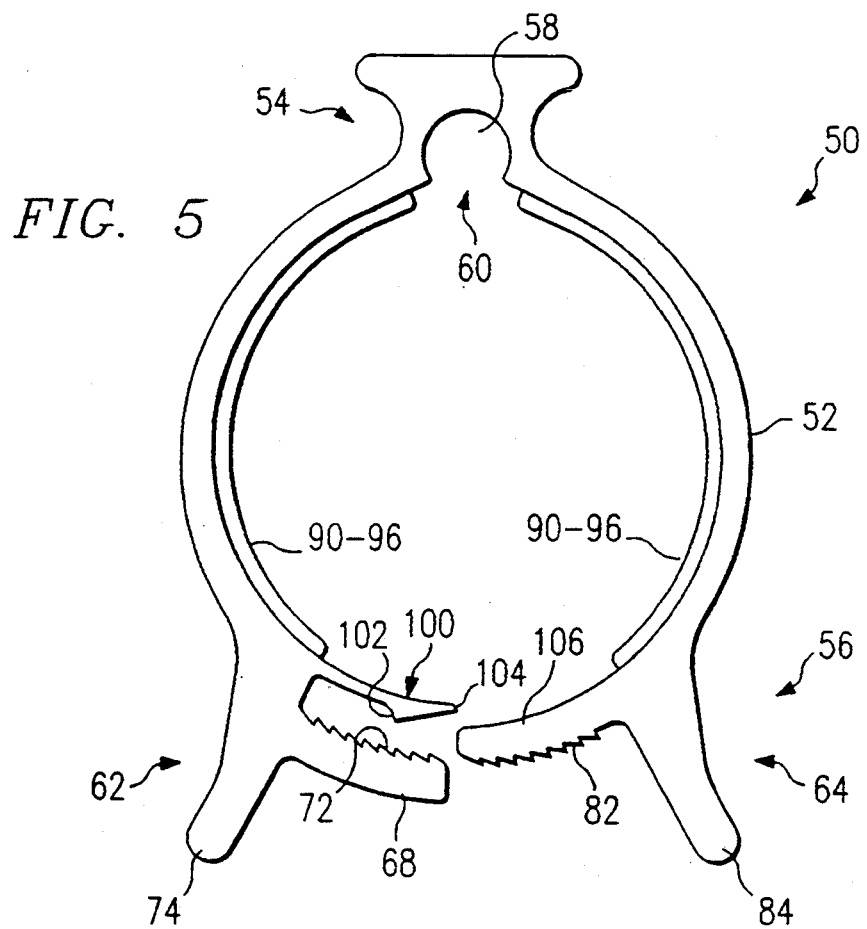
FIG. 5 is a side elevational view of another preferred embodiment of the irrigation hose hanger.

Referring to FIG. 5, yet another preferred embodiment of the irrigation hose hanger 50 is shown. Like reference numerals are used to refer to like parts in FIGS. 4 and 5. Hose hanger 50 has an annular band 52 with at least one compression ridge 90–96 formed along an inner surface thereof, and a hose clamping assembly 56. The wire clamping member 54 is adapted to tightly grip a wire of the size commonly used in the field of drip irrigation. Preferably, the diameter of wire clamping member 54 is only slightly less than that of the irrigation wires. Since the hose clamping assembly 56 is integral with the wire clamping member 54, when the annular band 52 is securely fastened around the hose by engaging the hose clamping assembly 56, the wire clamping assembly 54 is forcibly and tightly clamped around the wire.

Unlike the embodiments shown in FIGS. 3 and 4, the hose clamping assembly 56 of the embodiment shown in FIG. 5 is modified to facilitate hose installation and removal or reuse. Interlocking member 62 preferably includes a jaw member 68 and a single-contact-point biasing tongue 100. Jaw member 68 includes generally triangular teeth 72 pointing toward the biasing tongue 100. Single-contact-point biasing tongue 100 has a protruding contact point 102 pointing toward jaw member 68. The biasing tongue 10 then tapers off into a point 104. Preferably, jaw member 68 of the embodiment shown in FIG. 5 is made stiffer than the other embodiments by slightly increasing the thickness thereof. A lever 74 is further provided to facilitate manual installation of the irrigation hose hanger 50.

Interlocking member 64 includes a jaw member 106 with generally triangular teeth 82. Comparing FIGS. 4 and 5, it is readily apparent that biasing tongue 78 is missing from the embodiment shown in FIG. 5. Furthermore, jaw member 106 is made slightly thinner to facilitate its entry between single-contact-point biasing tongue 100 and jaw member 68, and its engagement with jaw member 68. Similarly, a lever 84 is provided to facilitate manual installation.

Implemented in this manner, the installation of irrigation hose hanger 50 is made easier. As jaw members 68 and 106 is pressed together by manual pressure on levers 74 and 84, the single-contact-point biasing tongue 100 concentrates the pressure on jaw member 68 at one point at the forward position near its end 104. The single contact point 102 of biasing tongue 100 thus applies nearly the same pressure to jaw member 68 during the entire teeth engaging process. Additionally, since jaw member 106 is made thinner, it is more flexible and generates less friction between teeth 72 and 82 when they are being engaged. This preferred embodiment also facilitates the disengaging of jaw members 68 and 106 since biasing tongue 78 has been omitted. Because of the projected long life of the irrigation hose hanger of the instant invention, the hangers can be easily reused and adapted to changing applications.

Although hose hangers 10 and 50 are preferably constructed of a variety of injection moldable plastic or thermoplastic materials, other materials that possess similar advantageous properties may also be used. The material should be selected to provide sufficient rigidity yet flexibility to perform for the utility as herein described. Preferably, the material is resistant to ultraviolet light radiation, to further prolong the projected life of the hangers.

Although the present invention has been described in detail, it should be understood that various changes, substitutions and alterations can be made thereto without departing from the spirit and scope of the present invention as defined by the appended claims.

What is claimed is:

1. Apparatus for hanging an irrigation hose below a suspended wire comprising:
    a generally U-shaped wire clamping member having first and second ends and an opening therebetween for admitting said suspended wire, said wire clamping member securely and fixedly clamping around suspended wire;
    a first annular band portion integrally coupled to said first end of said wire clamping member and a second annular band portion integrally coupled to said second end of said wire clamping member, said annular band portions extending from said wire clamping member and forming a substantially annular cavity, said annular band portions further including at least one compression ridge extending along an inner surface of said band portions;
    a first hose clamping jaw member integrally coupled to said first annular band portion and having a plurality of teeth pointing toward said annular cavity;
    a single-contacting-point biasing tongue coupled to said first hose clamping jaw member and defining an elongated opening therewith, said single-contact-point biasing tongue extending from said first hose clamping jaw member and having a generally triangular point pointing generally away from said annular cavity and toward to said elongated opening; and
    a second hose clamping jaw member integrally coupled to said second annular band portion and having a plurality of teeth pointing away from said annular cavity, said teeth of said second hose clamping jaw member being adapted for meshing with said teeth of said first hose clamping jaw member as said second hose clamping jaw member enters said elongated opening, said single-contact-point biasing tongue urging said teeth of said jaw members together by applying pressure at a single point.

2. The apparatus, as set forth in claim 1, wherein said wire clamping member is located directly opposed to said first and second hose clamping jaw members on said substantially annular band across said annular cavity.

3. The apparatus, as set forth in claim 1, further comprising first and second lever means coupled to said free ends of said annular band portions for assisting said jaw members to tightly interlock and mesh so that said annular band portions are securely clamped around said hose.

4. The apparatus, as set forth in claim 1, wherein said sets of teeth of said jaw members are generally triangular.

5. The apparatus, as set forth in claim 1, wherein said compression ridge is formed along approximately one-half of the inner surface circumference of said annular band.

6. The apparatus, as set forth in claim 1, wherein said single-contact-point biasing tongue is adapted to exert pressure on said second jaw member at one point as said second jaw member teeth are being engaged with said first jaw member teeth.

* * * * *